United States Patent [19]
Izumi

[11] Patent Number: 5,467,395
[45] Date of Patent: Nov. 14, 1995

[54] TELEPHONE EXCHANGE APPARATUS

[75] Inventor: Michihiro Izumi, Kawasaki, Japan

[73] Assignee: Canon Kabushiki Kaisha, Tokyo, Japan

[21] Appl. No.: 872,156

[22] Filed: Apr. 22, 1992

[30] Foreign Application Priority Data

Apr. 23, 1991 [JP] Japan .................................. 3-092292

[51] Int. Cl.⁶ .................................................. H04M 19/00
[52] U.S. Cl. ........................ 379/399; 379/339; 379/351; 379/277; 370/110.3
[58] Field of Search ........................ 379/399, 156, 379/98, 27, 277, 93, 351, 339; 375/122

[56] References Cited

U.S. PATENT DOCUMENTS

| | | | |
|---|---|---|---|
| 4,479,188 | 10/1984 | de Keijzer | 379/283 |
| 4,575,584 | 3/1986 | Smith et al. | 379/277 |
| 4,953,200 | 8/1990 | Yamasaki | 379/156 |
| 5,070,524 | 12/1991 | Mano | 379/165 |
| 5,155,772 | 10/1992 | Branoman et al. | 381/32 |
| 5,163,050 | 11/1992 | Cromack | 379/339 |
| 5,163,079 | 11/1992 | Crowdis | 379/27 |
| 5,175,764 | 12/1992 | Patel et al. | 379/399 |
| 5,214,693 | 5/1993 | Chujo | 379/351 |
| 5,216,704 | 6/1993 | Williams et al. | 379/93 |
| 5,323,460 | 6/1994 | Warner et al. | 379/399 |
| 5,341,417 | 8/1994 | Hwang et al. | 379/399 |

FOREIGN PATENT DOCUMENTS

| | | |
|---|---|---|
| 56-90666 | 10/1981 | Japan . |
| 59-44188 | 6/1984 | Japan . |
| 1212169 | 8/1989 | Japan . |
| 2401138 | of 0000 | United Kingdom . |
| 2159019 | 11/1985 | United Kingdom . |
| 8000289 | 7/1978 | WIPO . |
| 8000289 | 2/1980 | WIPO . |

*Primary Examiner*—Jeffery A. Hofsass
*Assistant Examiner*—Jacques Saint-Surin
*Attorney, Agent, or Firm*—Fitzpatrick, Cella, Harper & Scinto

[57] ABSTRACT

When there is an incoming call to a digital line and the digital line is to be connected to a digital terminal, a CPU connects the line and the terminal directly. When the digital line is to be connected to an analog individual line telephone or the like, the line and the terminal are connected via a level controller. The level controller shifts, to an appropriate level, the level of a voice signal represented by data received from the digital line, and the analog individual line telephone or the like connected to the extension receives the voice signal shifted to the appropriate level.

21 Claims, 9 Drawing Sheets

| TS0 | TS1 | TS2 | TS3 | TS4 | TS5 |
|---|---|---|---|---|---|
| −21dB | −18dB | −15dB | −12dB | −9dB | −6dB |
| DATA 00 | 01 | 02 | 03 | 04 | 05 |

FIG. 3

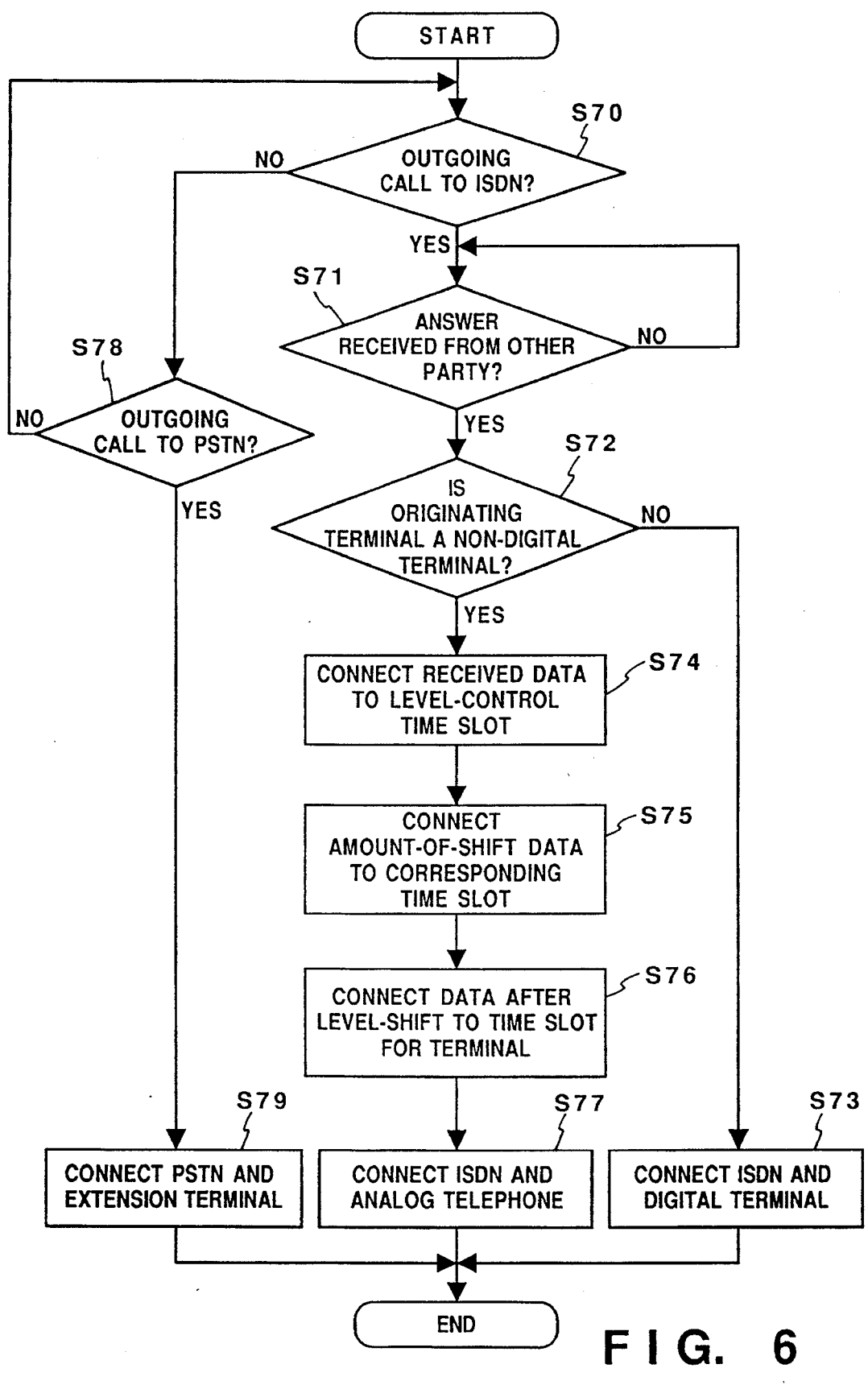
F I G. 6

TELEPHONE EXCHANGE APPARATUS

BACKGROUND OF THE INVENTION

1. Field of the Invention

This invention relates a telephone exchange apparatus which accommodates a plurality of outside lines and a plurality of extension terminals and converts the levels of signals received from the outside lines.

2. Description of the Prior Art

In a case where an extension accommodates an individual telephone (an analog telephone) in a conventional telephone exchange apparatus, the level in the telephone exchange is adjusted so as to assure equal speech quality even if the individual telephone is connected to the extension or even if it is directly connected to a main wire.

Further, in a case where a leased telephone of a telephone exchange apparatus is accommodated in an extension in the conventional telephone exchange apparatus, the arrangement is such that by adjusting the overall gain of the leased telephone and the telephone exchange apparatus, the optimum speech quality is obtained when the leased telephone carries on a telephone conversion by an analog line.

Owing to the greater popularity of digital communication networks, situations in which the main wire of a telephone exchange apparatus accommodates a digital line are increasing.

With regard to a telephone conversation via a digital line in the conventional telephone exchange apparatus, the gain within the apparatus is set at 0 dB in order to assure a speech quality equal to that which prevails when a digital telephone connected to an extension is connected to a digital network. In other words, the conventional telephone exchange apparatus is so adapted that data identical with the incoming data from an outside line is transmitted to the extension telephone.

However, when a signal from a digital network is received in an individual telephone accommodated in the conventional telephone exchange apparatus, a problem which arises is that the sound volume of the received speech is too large. Furthermore, even in the case of a leased telephone accommodated in the conventional telephone exchange apparatus, the gain is adjusted so as to obtain the optimum speech quality if the telephone conversation is carried on by an analog line, as mentioned above. When a signal is received from a digital network, however, the sound volume of the received speech is too large.

SUMMARY OF THE INVENTION

Accordingly, an object of the present invention is to provide a telephone exchange apparatus which solves the aforementioned problems.

Another object of the present invention is to provide a telephone exchange apparatus in which the signal level of a signal received from an outside line is converted in dependence upon the type of outside line to be connected and the type of extension terminal, whereby when a signal received from a digital network is received by an individual telephone and a leased telephone accommodated in an extension, the problem of excessive speech volume is ameliorated so that the optimum speech volume can be obtained irrespective of the type of terminal accommodated in the extension and the type of outside line.

According to the present invention, the foregoing objects are attained by providing a telephone exchange apparatus comprising receiving means for receiving voice code data from a digital network, and converting means for digitally converting the voice code data received by the receiving means, the converting means performing the digital conversion in such a manner that signal level is attenuated when the digitally converted voice code data has been decoded.

Further, according to the invention, the foregoing objects are attained by providing a telephone exchange apparatus comprising receiving means for receiving voice code data from a digital network, and decoding means for decoding the voice code data received by the receiving means, the decoding means performing decoding in such a manner that signal level is attenuated when the voice code data is decoded.

Further, according to the invention, the foregoing objects are attained by providing a telephone exchange apparatus comprising an outside-line interface for accommodating a digital network and an analog network, an extension interface for accommodating a digital terminal and an analog terminal, and converting means for converting voice signal level, the converting means converting the voice signal level when a voice signal from the digital network is transmitted to the analog terminal.

Further, according to the invention, the foregoing objects are attained by providing a telephone exchange apparatus comprising outside-line accommodating means capable of accommodating an outside line of a predetermined type, extension accommodating means capable of accommodating extension terminals of a plurality of types, and converting means for converting voice signal level, the converting means converting the voice signal level from the outside line accommodated in the external-line accommodating means in dependence upon type of the outside line to be connected and the type of extension.

In accordance with the above-described arrangement, the signal level of the signal received from the outside line is converted in dependence upon the type of outside line to be connected and the type of extension terminal. As a result, the telephone exchange apparatus according to the invention provides the optimum speech quality irrespective of the type of terminal connected to the extension and the type of outside line.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram showing an example of time-slot allocation of a level control highway according to the embodiment;

FIG. 6 is a flowchart describing an example of operation when an outgoing call is placed to an ISDN according to the embodiment;

DESCRIPTION OF THE PREFERRED EMBODIMENT

An embodiment of the present invention will now be described in detail with reference to the drawings.

Figure 1:
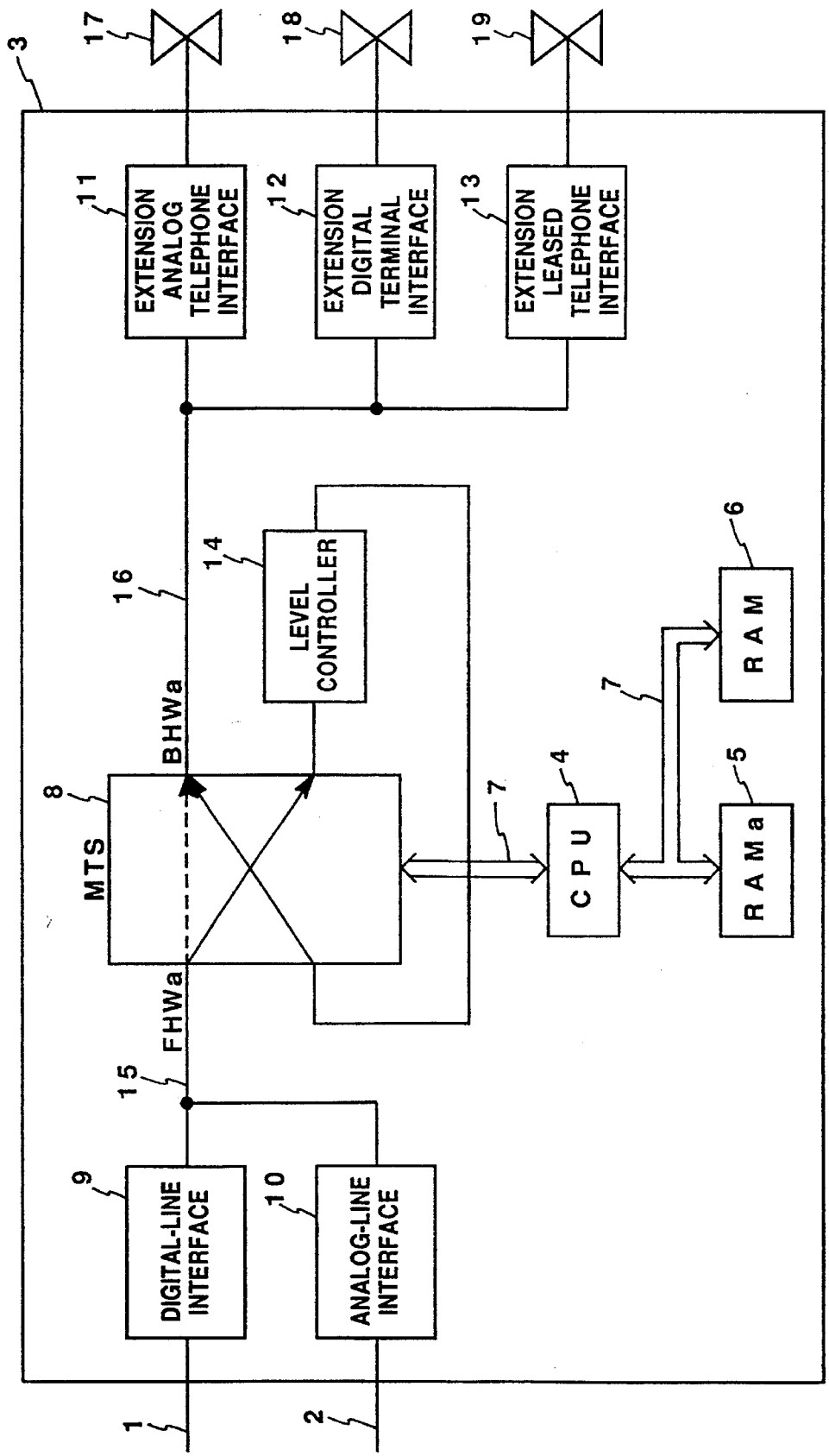
FIG. 1 is a block diagram illustrating an example of the construction of an embodiment of a telephone exchange apparatus according to the present invention.

FIG. 1 is a block diagram illustrating an example of the construction of an embodiment of a telephone exchange apparatus according to the present invention.

As shown in FIG. 1, a digital line 1 such as an ISDN and an analog line 2 are connected to a telephone exchange apparatus 3.

The telephone exchange apparatus 3 includes a CPU 4, a $ROM_a$ 5 and a RAM 6 interconnected via a CPU bus 7 which contains an address bus and a data bus, an exchange switch (MTS) 8 controlled by the CPU 4 via the CPU bus 7, a digital-line interface 9, an analog-line interface 10, an extension analog individual telephone interface 11, an extension digital terminal interface 12, an extension leased-telephone interface 13, and a level controller 14.

The digital-line interface 9 and the analog-line interface 10 are connected to the exchange switch 8 via an input highway ($FHW_a$) 15. The extension analog individual telephone interface 11, extension digital terminal interface 12 and extension leased-telephone interface 13 are connected to the exchange switch 8 via an output highway ($BHW_a$) 16.

An analog individual telephone 17 is connected to the extension analog individual telephone interface 11, a digital terminal 18 is connected to the extension digital terminal interface 12, and an individual telephone 19 is connected to the extension leased-telephone interface 13.

In FIG. 1, only one digital line 1, one analog line 2, one analog individual line telephone 17, one digital terminal 18 and one leased telephone 19 are shown to be connected to the telephone exchange apparatus 3. In actuality, however, a plurality of each of these lines and telephones are connected to the telephone exchange apparatus 3.

Though not shown in FIG. 1, the telephone exchange apparatus 3 has input highways leading to the exchange switch (MTS) 8 from the extension analog individual line telephone interface 11, extension digital terminal interface 12 and extension leased-telephone interface 13. Similarly, the telephone exchange apparatus 3 has input highways leading from the exchange switch (MTS) 8 to the digital-line interface 9 and analog-line interface 10.

Programs executed by the CPU 4 are stored in the $ROM_a$ 5. Further, the $ROM_a$ 5 and the RAM 6 store the correlation between voice data from the digital-line interface 9 and analog-line interface 10 and time slots on the input highway $FHW_a$ 15, the correlation between time slots on the input highway $FHW_a$ and each extension interface, as well as the types of outside lines at the respective accommodating positions and the types of extension interfaces.

The analog-line interface 10 includes a variable gain amplifier for amplifying the analog signal from the analog line 2, and a coder for coding the amplified analog signal.

The extension analog individual line telephone interface 11 includes a decoder for decoding the code data from the output highway $BHW_a$ 16, and a variable gain attenuator for attenuating the decoded analog signal.

Figure 2:
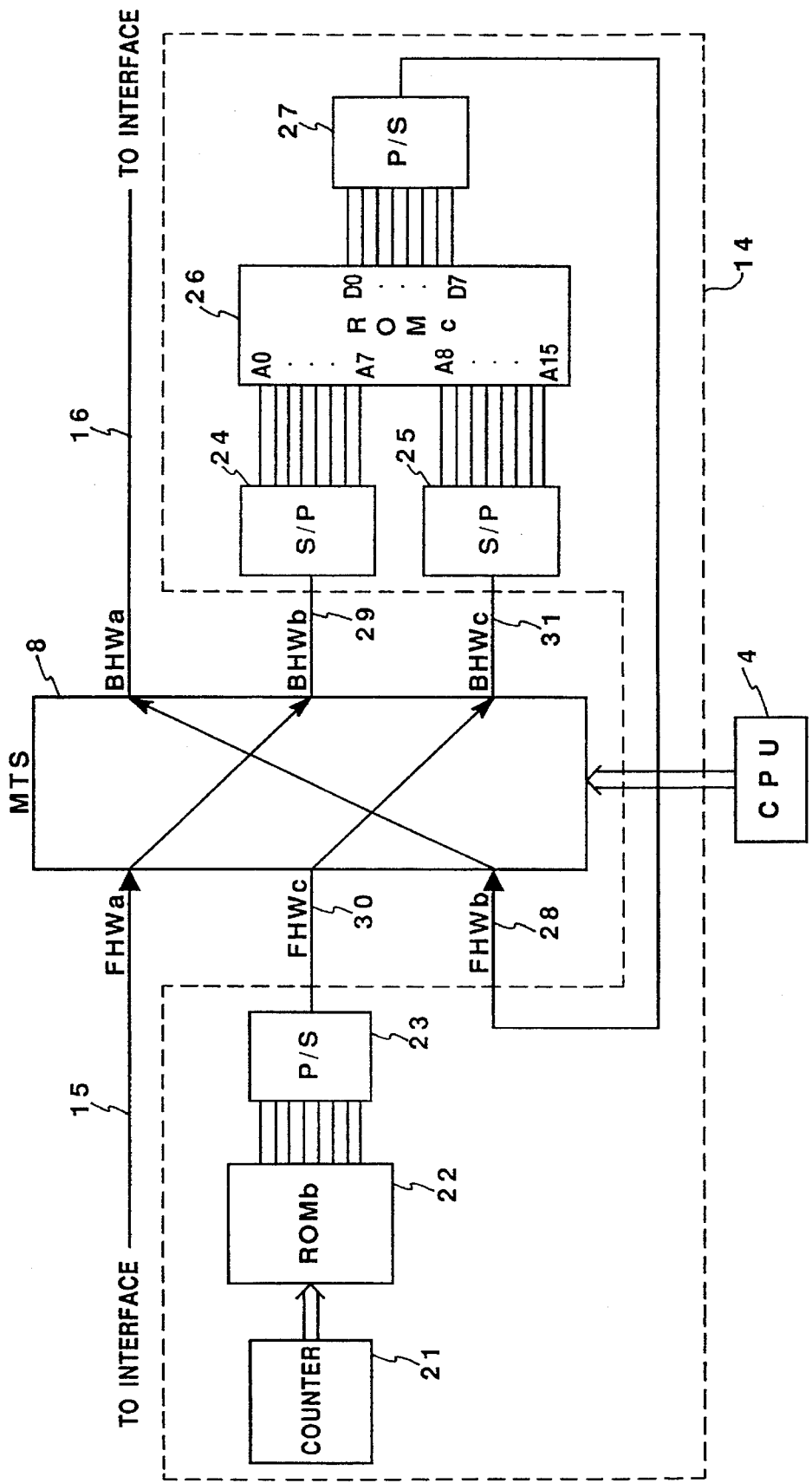
FIG. 2 is a block diagram illustrating an example of the construction of a level controller according to the embodiment.

FIG. 2 is a block diagram illustrating an example of the construction of the level controller 14 according to this embodiment.

As shown in FIG. 2, the level controller 14 includes a counter 21 for counting the period of the time slots, a $ROM_b$ 22 which stores data corresponding to level gain (degree of attenuation or degree of amplification), a parallel-serial converter ($P/S_a$) 23, a serial-parallel converter ($S/P_a$) 24, a serial-parallel converter ($S/P_b$) 25 and a parallel-serial converter ($P/S_b$) 27, a $ROM_c$ 26 which stores a look-up table for level shift, a second input highway $FHW_b$ 28, a second output highway $BHW_b$ 29, a level-control input highway $FHW_c$ 30, and a level-control output highway $BHW_c$.

On each highway shown in FIG. 2, the data flows in time-shared, multiplexed fashion in a plurality of time slots.

The level-shift operation of this embodiment will now be described in detail.

By way of example, in a case where a level shift of data in a time slot on the input highway $FHW_a$ 15 is carried out, this time slot, which has entered the exchange switch MTS 8, is connected to the second output highway $BHW_b$ 29 by control executed by the CPU 4. The data on the second output highway $BHW_b$ 29 is converted into eight-bit parallel data by the serial-parallel converter $S/P_a$ 24, and the resulting parallel data is inputted to the $ROM_c$ 26 as the eight lower-order bits $A_0$~$A_7$ of address data having a length of 16 bits.

The value of the count from the counter 21 enters the address terminals of the $ROM_b$ 22, and eight bits of parallel data are read out of the $ROM_b$ 22 at the period of one time slot. The parallel-serial converter $P/S_a$ 23 converts the parallel data inputted from the $ROM_b$ 22 into serial data, multiplexes the serial data in time-shared fashion and outputs the data to the level-control input highway $FHW_c$ 30.

FIG. 3 is a diagram showing an example of time-slot allocation of the level control highway according to the embodiment. As shown in FIG. 3, level gains are allocated to time slots TS0, TS1, TS2, . . . , and each time slot possesses corresponding eight-bit data. In other words, in conformity with the timing at which each level gain is outputted in time-shared fashion to the level-control input highway $FHW_c$ 30, the counter 21 changes over the address of the $ROM_b$ 22 and the parallel-serial converter $P/S_a$ 23 outputs the serial data to the level-control input highway $FHW_c$ 30.

The level-control input highway $FHW_c$ 30 is connected to the level-control output highway $BHW_c$ 31 by control executed by the CPU 4. The serial data on the level-control output highway $BHW_c$ 31 is converted into eight-bit parallel data by the serial-parallel converter $S/P_b$ 25, and the resulting parallel data is inputted to the $ROM_c$ 26 as the eight higher-order bits $A_8$~$A_{15}$ of address data having a length of 16 bits.

Control of the exchange switch MTS 8 and the principle of the level shift according to this embodiment will now be described with regard to an example in which the data (the data received from the digital line 1) in time slot TS0 on input highway $FHW_a$ 15 is attenuated 15 dB.

The CPU 4 controls the exchange switch MTS 8 to connect the time slot TS2 (−15 dB) of the level-control input highway $FHW_c$ 30 and the time slot TS0 of the level-control output highway $BHW_c$ 31, as well as the time slot TS0 (digital line 1) of the input highway $FHW_a$ 15 and the time slot TS0 of the second output highway $BHW_b$ 29. That is, in the level controller 14 of the embodiment shown in FIG. 2, the data (02="00000010") of time slot TS2 on the level-control input highway $FHW_c$ 30 enters the address terminals $A_8$~$A_{15}$ of the $ROM_c$ 26 when the data of time slot TS0 on the second output highway $BHW_b$ 29 has entered the terminals $A_0$~$A_7$ of the $ROM_c$ 26.

Since the degree of attenuation of the eight higher-order bits $A_8$~$A_{15}$ of the input address is −15 dB, the shift ratio k is 0.177828.

Further, the eight lower-order bits $A_0$~$A_7$ (hereinafter referred to as "data y" of the input address are decoded in accordance with a voice decoding law (μ-law). Let x represent the data obtained by decoding the data y. Coded data z obtained by coding, in accordance with a voice coding law (μ-law), level shift data kx resulting from multiplying the shift ratio k by the decoded data x, has already been stored at the designated address of the $ROM_c$ 26

The $ROM_c$ 26 outputs the coded data z. More specifically, the level controller 14 of the embodiment shown in FIG. 2 is such that the data z corresponding to the data y inputted to the address terminals $A_0$~$A_7$ of the $ROM_c$ 26 is outputted from the data terminals $D_0$~$D_7$ of the $ROM_c$ 26. The data z is the coded data of the voice signal whose signal level, which is indicated by the data y, has been attenuated 15 dB.

The coded data z outputted from the $ROM_c$ 26 in FIG. 2 is converted into serial data by the parallel-serial converter $P/S_b$ 27, and the serial data enters the exchange switch MTS 8 as the data of time slot TS0 on the second input highway $FHW_b$ 28. The CPU 4 connects the time slot TS0 of the second input highway $FHW_b$ 28 and the appropriate time slot on the output highway $BHW_a$ 16.

More specifically, the data of time slot TS0 on the input highway $FHW_a$ 15 is level-shifted, and the resulting level-shifted data is connected to the time slot allocated to the terminal (e.g., the leased telephone 19 or the analog individual line telephone 17) from which an output is desired.

In a case where data received from the digital line 1 is outputted to the digital terminal 18 connected to the extension, the CPU 4 controls the exchange switch MTS 8 in such a manner that the input highway $FHW_a$ 15 and the output highway $BHW_a$ 16 are directly connected, as a result of which this data will not pass through the level controller 14.

Thus, in accordance with this embodiment, the level of the voice signal indicated by the data received from the digital line 1 can be shifted to an appropriate level. As a result, the problem of excessive sound volume of a received voice does not arise even if a signal received from the digital line 1 is received by the analog individual line telephone 17 or the leased telephone 19 connected to the extension.

Figure 4:
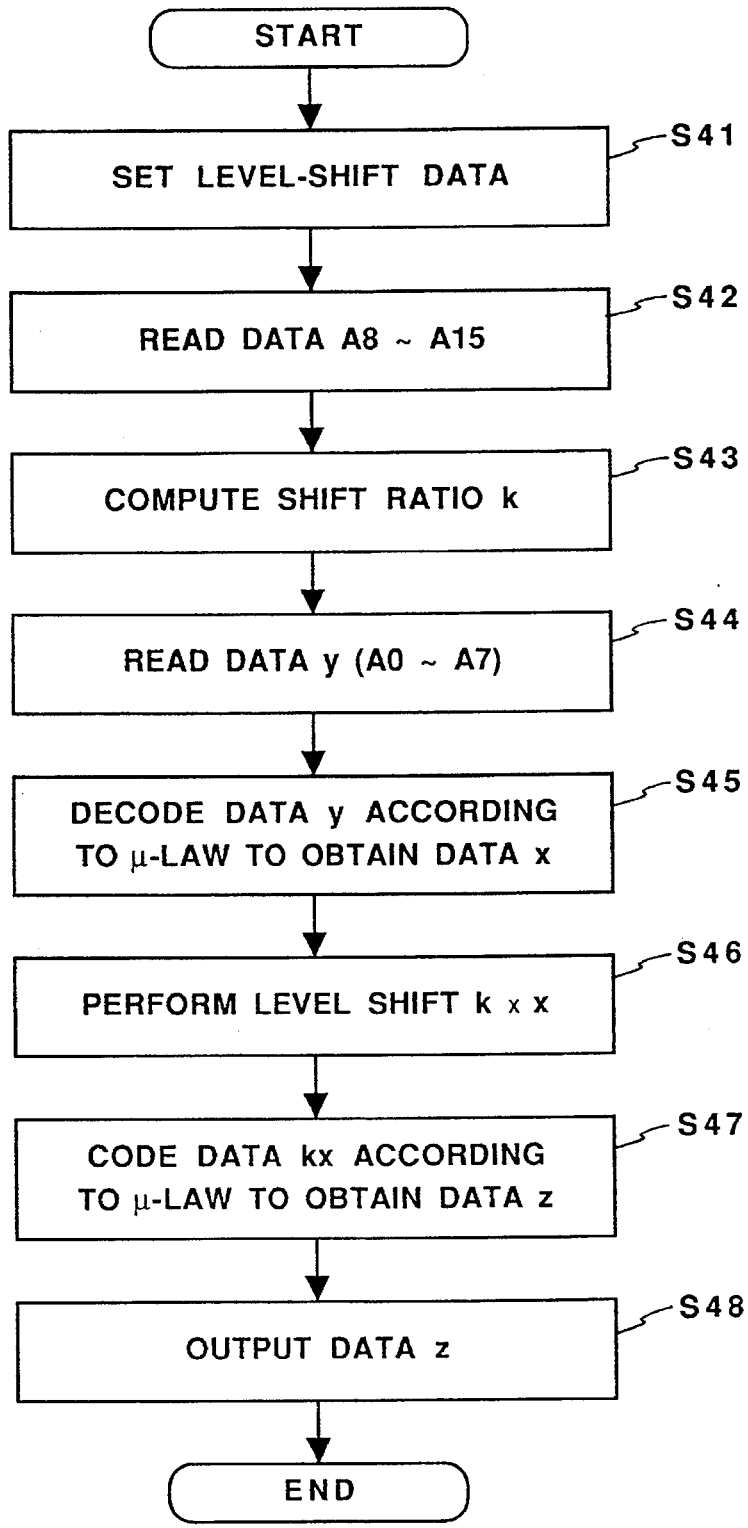
FIG. 4 is a flowchart illustrating an example of a level-shift operation according to the embodiment.

FIG. 4 is a flowchart illustrating an example of the level-shift operation according to another embodiment of the invention. The flow shown in FIG. 4 is for a case where the level shift is executed by an arithmetic operation using a microcomputer, rather than relying upon the $ROM_c$ 26.

In FIG. 4, step S41 calls for the CPU 4 to control the exchange switch MTS 8 so as to connect the time slot TS2 (−15 dB) of the level-control input highway $FHW_c$ 30 and the time slot TS0 of the level-control output highway $BHW_c$ 31, thereby setting the data for the level shift. Further, the CPU 4 connects the time slot TS0 of the level-control input highway $FHW_a$ 15 and the time slot TS0 of the second output highway $BHW_b$ 29. That is, in the level controller 14 of the embodiment shown in FIG. 2, the data (02="00000010") of time slot TS2 on the level-control input highway $FHW_c$ 30 enters address terminals $A_8$~$A_{15}$ of the microcomputer (which in this embodiment is used instead of the $ROM_c$ 26) when the data of time slot TS0 on the second output highway $BHW_b$ 29 has entered address terminals $A_0$~$A_7$ of the microcomputer.

Next, in this embodiment, the microcomputer reads the eight higher-order bits $A_8$~$A_{15}$ of the set data at step S42, and the microcomputer computes the shift ratio k at step S43. Specifically, since the set degree of attenuation is −15 dB, the shift ratio is calculated in accordance with the following equations:

$$20\log k = -15 \text{db} \quad (1)$$

$$k = 10^{-15/20} = 0.177828 \quad (2)$$

This is followed by step S44, at which the microcomputer reads the eight lower-order bits $A_0$~$A_7$ of the set data. Then, at step S45, the microcomputer decodes the data y in accordance with the voice decoding law (μ-law). That is, the microcomputer decodes the data y to obtain the data x on the basis of the following equation:

$$x = sgn(y) \frac{(\mu+1)^{|y|}-1}{\mu} \quad (3)$$

The microcomputer then multiplies the shift ratio k by the decoded data x and performs a level shift at step S46. Next, at step S47, the microcomputer codes the level-shift data kx in accordance with the voice coding law (μ-law). That is, the microcomputer codes the level-shift data kx to obtain the data z on the basis of the following equation:

$$z = sgn(kx) \frac{\ln(1+\mu^{|kx|})}{\ln(1+\mu)} \quad (4)$$

This is followed by step S48, at which the microcomputer outputs the coded data z. From this point onward, the processing is the same as that for the case where the level shift was performed by table conversion carried out by the $ROM_c$ 26.

It should be noted that voice data, which is obtained by shifting all voice data by respective amounts of shift in accordance with Eqs. (1) through (4), is stored in the $ROM_c$ 26 in advance.

Next, operation of the embodiment in case of an incoming call from an ISDN (digital line 1) will be described.

Figure 5:
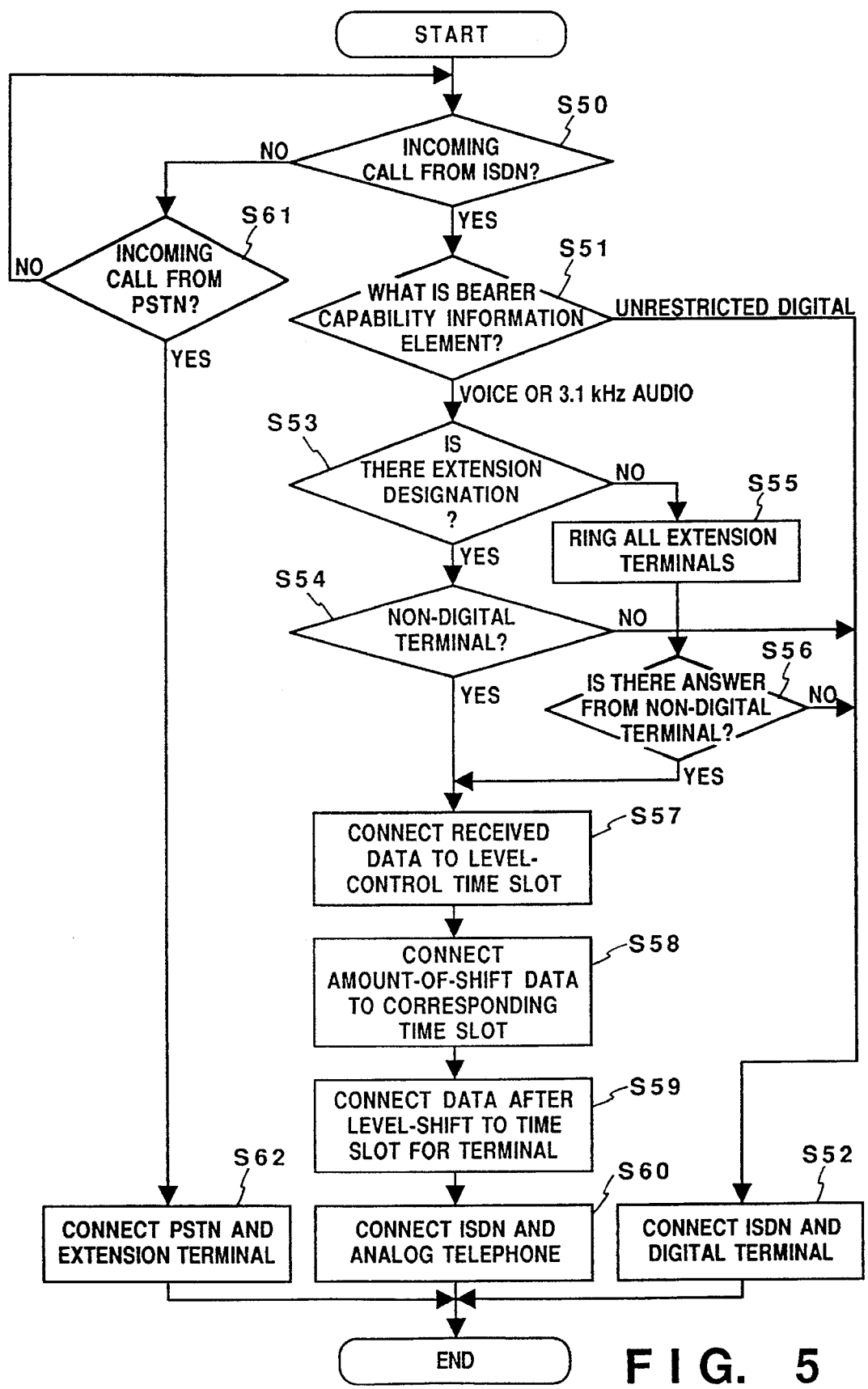
FIG. 5 is a flowchart describing an example of operation when there is an incoming call from an ISDN according to the embodiment.

FIG. 5 is a flowchart for describing an example of operation when there is an incoming call from an ISDN according to the embodiment.

In FIG. 5, the CPU 4 determines at step S50 whether there is an incoming call from an ISDN (digital line 1). The program proceeds to step S51 if there is an incoming call from the ISDN and to step S61 in the absence of a call from the ISDN. Steps S61 and S62 represent processing for a case where there is an incoming call from a pay station network PSTN (analog line 2). A detailed description of these steps is omitted.

At step S51, the CPU 4 reads a bearer capability information element (see CCITT Recommendation I.451) contained in D-channel (control channel) data and proceeds to step S53 if the bearer capability information element is indicative of a voice or 3.1 KHz audio. If the bearer capability information element is indicative of unrestricted digital information, the program proceeds to step S52, at which the ISDN (digital line 1) and digital terminal 18 are connected, after which processing is terminated.

The CPU 4 determines at step S53 whether an extension has been designated or not as by dialing an extension has been designated, then the program proceeds to step S54. If an extension has not been designated, the program proceeds to step S55. The program proceeds to step S57 if the CPU 4 determines at step S54 that the terminal connected to the designated extension is a non-digital terminal, and to step S52 if the CPU 4 determines at step S54 that the terminal connected to the designated extension is a digital terminal. The CPU 4 connects the digital line 1 to the designated digital terminal 18 at step S52 and then terminates processing.

The CPU 4 rings all extension terminals once at step S55 then, by referring to the RAM 6, discriminates at step S56 the type of the extension terminal that has answered. If the terminal is a non-digital terminal, the program proceeds to step S57. If the terminal is a digital terminal, the program proceeds to step S52. The ISDN (digital line 1) and the digital terminal 18 are connected at step S52, after which processing is ended.

In a case the digital line 1 and the analog individual line telephone 17 are connected, the CPU 4 controls the exchange switch MTS 8 to connect the received data from the digital line 1 to the level-control time slot at step S57, connect the data indicating the amount of shift (e.g., −15 dB) to the corresponding level-control time slot at step S58, connect the level-shifted data outputted by the level controller 14 to the time slot of the terminal to be connected at step S59, and connect the ISDN (digital line 1) and analog telephone (the analog individual line telephone 17 or leased telephone 19) at step S60, after which the CPU 4 ends processing.

In the foregoing description and FIG. 5, it is explained that the bearer capability information element is used in discriminating whether the received data from the digital line 1 represents a voice or not. However, this does not impose a limitation upon the invention. For example, it is possible to use a high layer compatibility information element (see CCITT Recommendation I.451) for identifying the communication medium.

Thus, in accordance with this embodiment, when an incoming call is received from an ISDN (digital line 1) and the digital line 1 is to be connected to the digital terminal 18, the line and the terminal are connected directly. If the digital line 1 and the analog individual line telephone 17 are to be connected, the line and the terminal are connected via the level controller 14. Therefore, if an incoming call is received from an ISDN (digital line 1), the appropriate speech quality can be obtained irrespective of the type of extension terminal connected.

Operation when an outgoing call is placed to an ISDN (digital line 1) according to this embodiment will now be described.

FIG. 6 is a flowchart for describing an example of operation when an outgoing call is placed to an ISDN according to the embodiment.

In FIG. 6, the CPU 4 determines at step S70 whether there is an outgoing call from an extension terminal to an ISDN (digital line 1. If there is an outgoing call to the ISDN, the program proceeds to step S71. If there is no outgoing call to the ISDN, the program proceeds to step S78. Steps S78 and S79 represent processing for a case where there is an outgoing call to a pay station network PSTN (analog line 2). A detailed description of these steps is omitted.

The CPU 4 waits for an answer from the communicating party at step S71 and executes the processing of step S72 when the party answers. By referring to the RAM 6 at step S72, the CPU 4 discriminates the type of the call-originating extension terminal. If the extension terminal is a non-digital terminal, the program proceeds to step S74. If the extension terminal is the digital terminal 18, the program proceeds to step S73. The ISDN (digital line 1) and the originating digital terminal 18 are connected at step S73, after which processing is ended.

From steps S74 to S76, the CPU 4 executes processing identical to that of steps S57 to S59 shown in FIG. 5. Then, at step S77, the CPU 4 connects the ISDN (digital line 1) and the originating analog telephone (the individual line telephone 17 or the leased telephone 19), after which processing is terminated.

Thus, in accordance with this embodiment, the level controller 14 does not serve as an intermediary when there is an outgoing call from the digital terminal 18 to the ISDN (digital line 1). When there is an outgoing call from the analog individual line telephone 17 to the ISDN (digital line 1), the call is placed to the ISDN (digital line 1) through the level controller 14. In either case, the appropriate speech quality can be obtained without relation to the type of extension terminal from which the outgoing call originates.

There are occasions where it is desired to adjust speech sound volume in accordance with the state of the line of the preference of the user when a call is received from digital line 1. A method of setting speech sound volume in accordance with the embodiment will now be described.

In this embodiment, speech sound volume is decided depending upon which time slot of the level-control input highway $FHW_c$ 30 is connected to the time slot of the level-control output highway $BHW_c$ 31 shown in FIG. 2. More specifically, items of data corresponding to a variety of levels are allocated to the time slots of the level-control input highway $FHW_c$ 30, as illustrated in FIG. 3, and speech sound volume is decided by which data is inputted to the eight higher-order bits $A_8$–$A_{15}$ of the address terminals of the $ROM_c$ 26 shown in FIG. 2.

Figure 7:
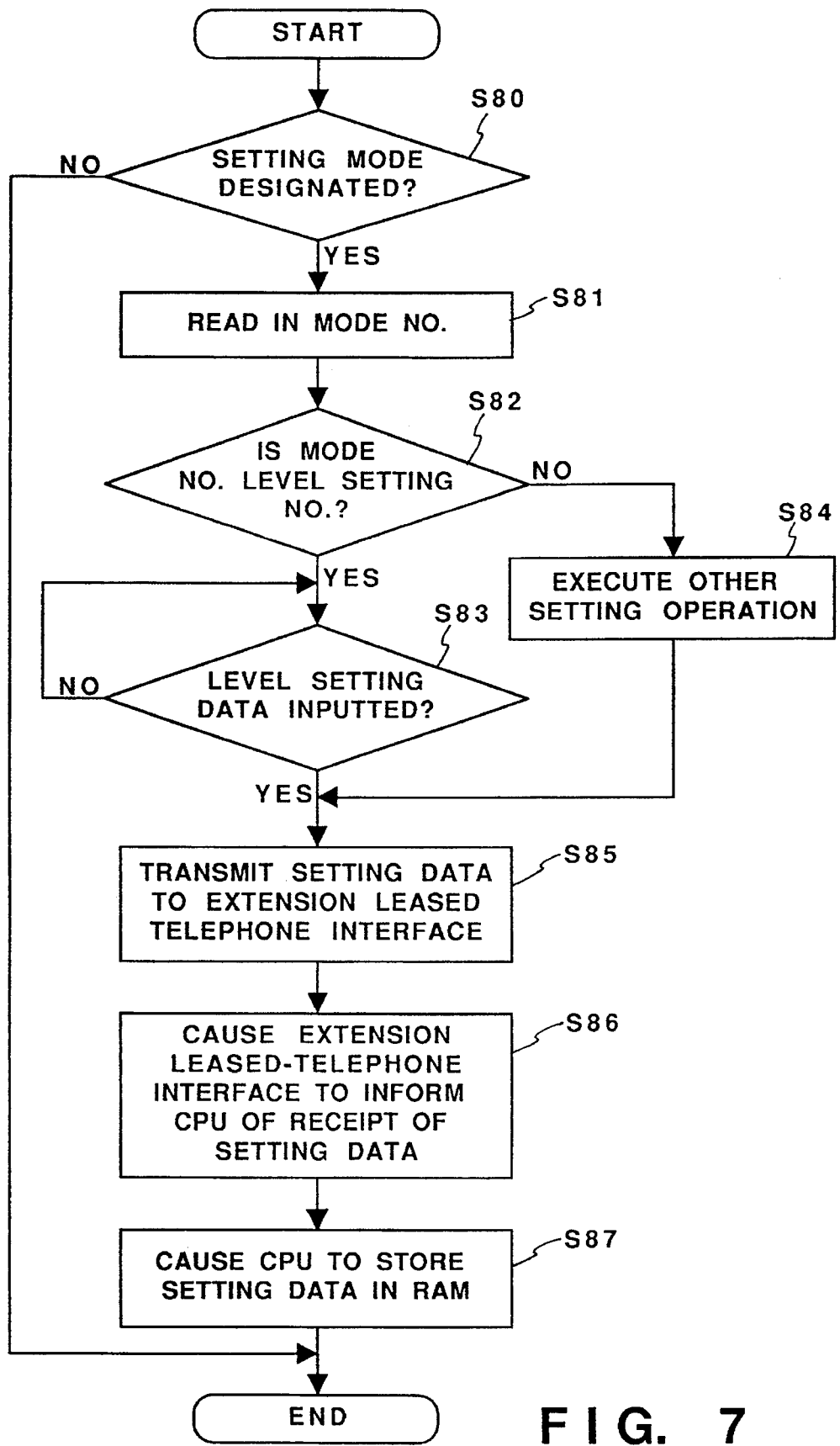
FIG. 7 is a flowchart describing an example of operation when speech volume is set according to the embodiment.

FIG. 7 is a flowchart for describing an example of operation when speech volume is set according to the embodiment. In this embodiment, speech sound volume is capable of being set by manipulation of the leased telephone 19.

In FIG. 7, the leased telephone 19 determines at step S80 whether a setting mode has been designated by the user. The program proceeds to step S81 if the setting mode has been designated. If the setting mode has not been designated, processing is terminated without any other action being taken.

Next, at step S81, the leased telephone 19 reads in the mode number entered by the user and then, at step S82, determines whether the mode number is a number which corresponds to the level setting mode for for setting the level of voice sound volume. If the mode number is that indicative of the level setting mode, then the program proceeds to step S83. If the mode number is not that indicative of the level setting mode, then the program proceeds to step S84, at which a different setting operation is executed. The program then proceeds to step S85.

At step S83, the leased telephone 19 waits for an input of level setting data. When the level setting data is entered, the program proceeds to step S85. At this step the leased telephone 19 transmits the entered level setting data to the interface 13 for the extension leased telephone. At step S86, the interface 13 informs the CPU 4 of the fact that the setting data has been received. This is followed by step S87, at which the CPU 4 stores the level setting data received by the interface 13, namely the entered outside-line number and the amount of shift, in the RAM 6.

Thereafter, the CPU 4 refers to the RAM 6 to connect the time slot on the level-control input highway $FHW_c$ 30 corresponding to a level newly set by the user to the time slot on the level-control output highway $BHW_c$ 31. For example, in a case where a −9 dB level has been set anew, the CPU 4 connects the time slot TS4 on the level-control input highway $FHW_c$ 30 shown in FIG. 3 to the time slot TS0 on the level-control output highway $BHW_c$ 31, thereby making it possible to adjust, based upon the state of the line and the preference of the user, the speech sound volume when a call is received from the digital line 1.

Processing according to the embodiment will now be described for a case where a telephone conversation takes place using the pay station network PSTN (analog line 2).

In this embodiment, the variable gain amplifier of the analog-line interface 10 is adjusted in such a manner that an appropriate speech sound volume is obtained in a case where a voice signal from the analog line 2 is sent to the digital terminal 18 without the intermediary of the level controller 14.

In this embodiment, the degree of attenuation of a variable attenuator in the extension analog individual line telephone interface 11 and the degree of attenuation of a variable attenuator incorporated in the leased telephone 19 are adjusted in such a manner that the appropriate speech sound volume will be obtained in a case where a voice signal from the analog line 2 has been transmitted to the analog individual line telephone 17 and the leased telephone 19, without the intermediary of the level controller 14, via the analog-line interface 10 whose gain has been adjusted in the manner described above.

Figure 8:
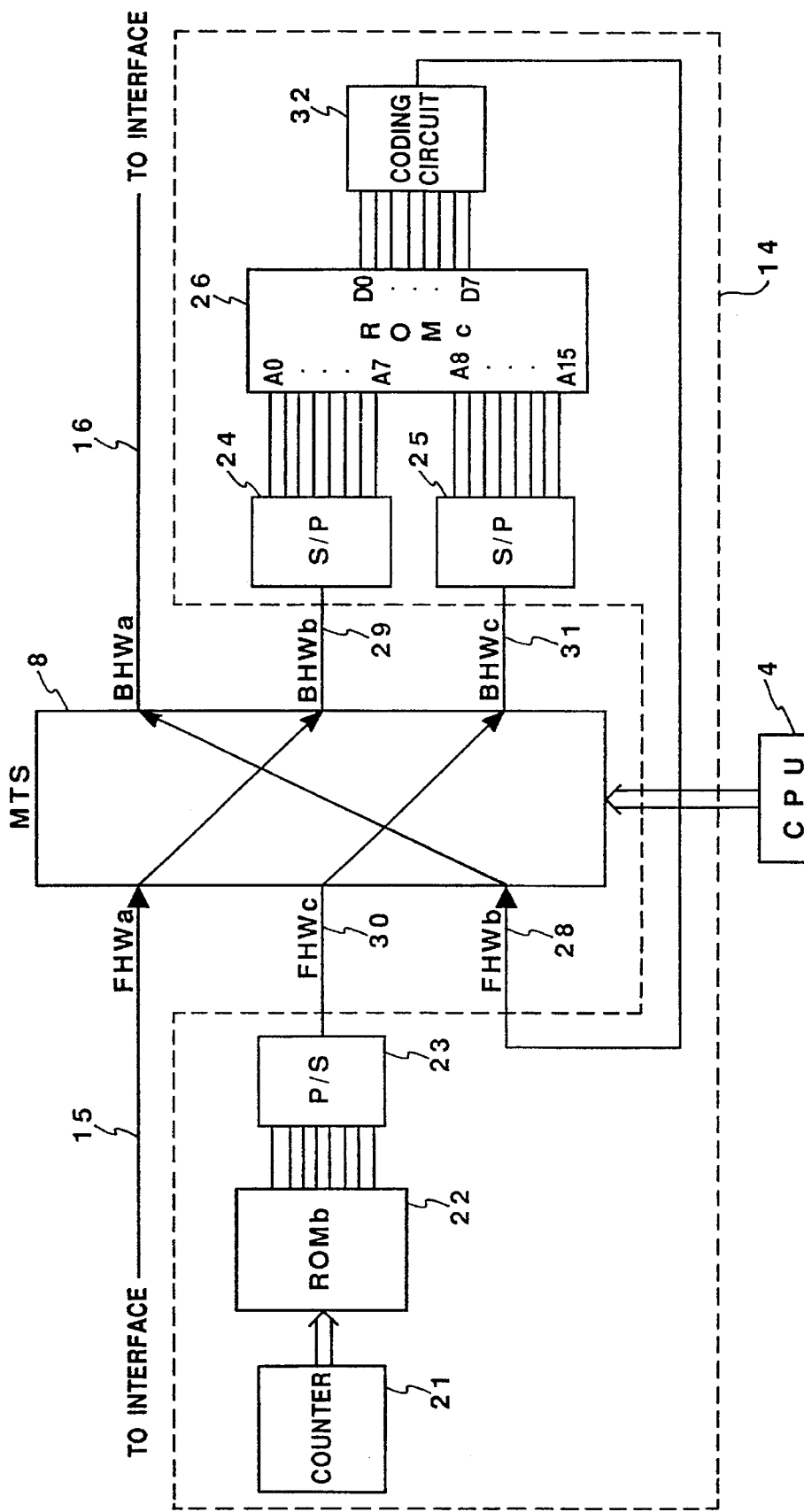
FIG. 8 is a block diagram illustrating an example of the construction of a level controller according to a second embodiment of the present invention.

FIG. 8 is a block diagram illustrating an example of the construction of the level controller 14 according to a second embodiment of the present invention.

The difference between the level controller 14 of the second embodiment shown in FIG. 8 and the level controller 14 of the first embodiment shown in FIG. 2 is that whereas the data terminals $D_0$–$D_7$ of the $ROM_c$ 26 are connected to the input terminals of the parallel-serial converter P/Sc 27 in the level controller 14 of the first embodiment, these data terminals are connected to the input terminals of a coding circuit 32 in the level controller 14 of the second embodiment. Other components are the same and are designated by like reference characters. These identical components need not be described in detail again.

In the second embodiment, code data received from the digital line 1 is decoded by the $ROM_c$ 26 and is outputted as a digital signal shifted to the suitable level. The digital signal shifted to the suitable level is then coded by the coding circuit 32.

Accordingly, the look-up table that has been stored in the $ROM_c$ 26 in the first embodiment also differs from that of the second embodiment.

Figure 9:
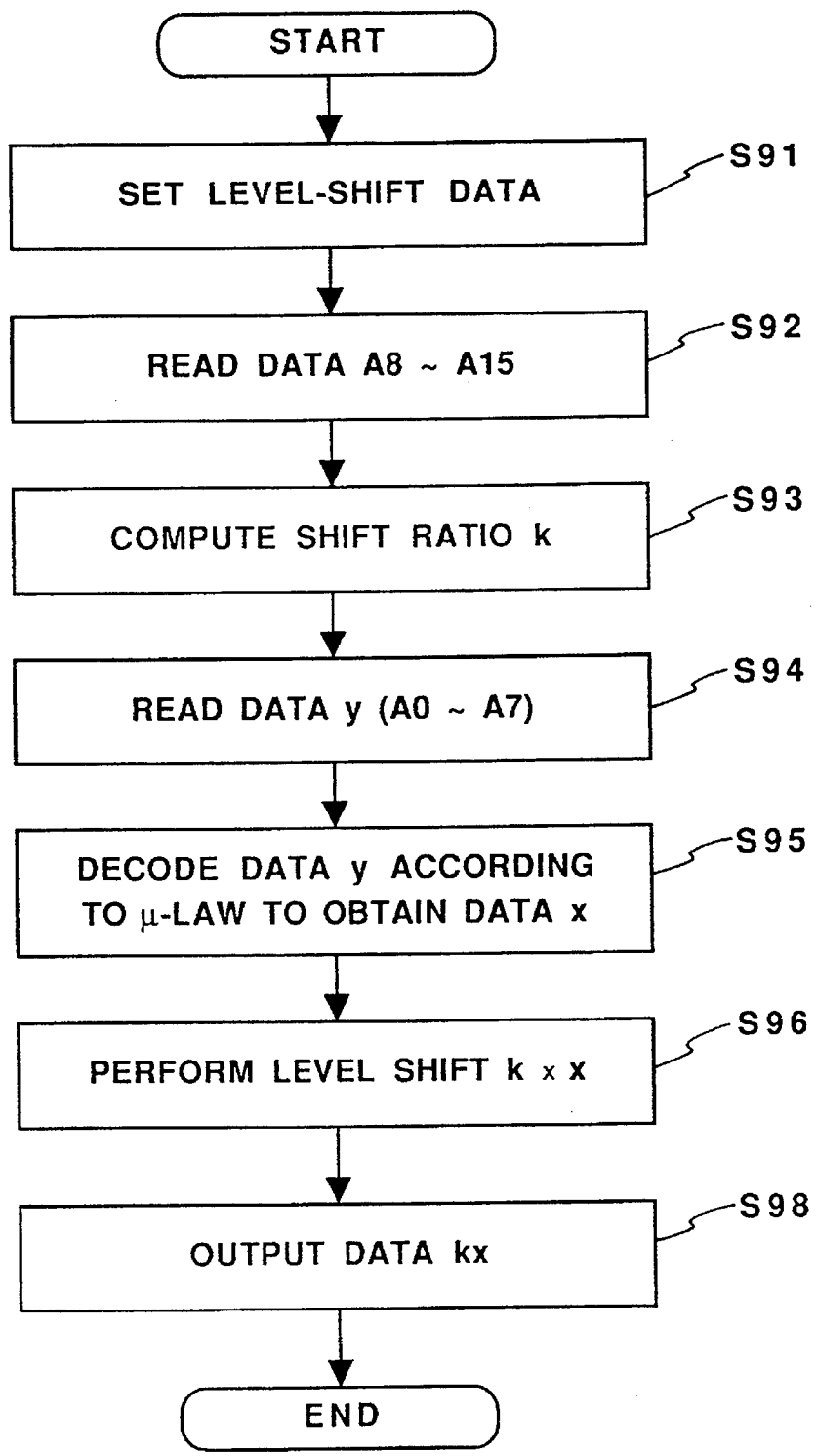
FIG. 9 is a flowchart illustrating an example of decoding and level-shift operation according to a second embodiment of the present invention.

FIG. 9 is a flowchart illustrating an example of decoding and level-shift operation according to a second embodiment of the present invention. The flow shown in FIG. 9 is for a case where decoding and level shift are executed by an arithmetic operation using a microcomputer, rather than relying upon the $ROM_c$ 26. Furthermore, the level controller 14 of the second embodiment shown in FIG. 8 executes the decoding and level-shift operations using a look-up table stored in the $ROM_c$ 26. More specifically, the level controller 14 of the second embodiment shown in FIG. 8 stores the results of executing decoding and level shift by the microcomputer in accordance with the flowchart of FIG. 8 in the $ROM_c$ 26 in the form of a look-up table.

At step S91 in FIG. 9, the CPU 4 controls the exchange switch MTS 8 to connect the time slot TS2 (−15 dB) of the level-control input highway $FHW_c$ 30 and the time slot TS0 of the level-control output highway $BHW_c$ 31, thereby setting the data for level shift. The CPU 4 then connects the time slot TS0 of the level-control input highway $FHW_a$ 15 and the time slot TS0 of the second output highway $BHW_b$ 29. That is, in the level controller 14 of the second embodiment shown in FIG. 8, the data (02="00000010") of time slot TS2 on the level-control input highway $FHW_c$ 30 enters the address terminals $A_8$–$A_{15}$ of the microcomputer when the data of time slot TS0 on the second output highway $BHW_b$ 29 has entered the address terminals $A_0$–$A_7$ of the microcomputer, which has been provided instead of the $ROM_c$ 26.

Next, in accordance with the second embodiment, the microcomputer reads the eight higher-order bits $A_8$–$A_{15}$ of the set data at step S92, and the microcomputer computes the shift ratio k at step S93. Specifically, since the set degree of attenuation is −15 dB, the microcomputer calculates the shift ratio in accordance with the following equations:

$$20 \log k = -15 db \tag{5}$$

$$k = 10^{-15/20} = 0.177828 \tag{6}$$

This is followed by step S94, at which the microcomputer reads the eight lower-order bits $A_0$–$A_7$ (hereinafter referred to as "data y") of the set data. Then, at step S95; the microcomputer decodes the data y in accordance with the voice decoding law (μ-law). That is, the microcomputer decodes the data y to obtain the data x on the basis of the following equation:

$$x = sgn(y) \frac{(\mu+1)^{|y|} - 1}{\mu} \tag{7}$$

The microcomputer then multiplies the shift ratio k by the decoded data x and performs a level shift at step S96. Next, at step S98, the microcomputer outputs voice signal data kx. That is, in the level controller 14 of the second embodiment shown in FIG. 8, the data kx corresponding to the data y inputted to the address terminals $A_0$–$A_7$ of the $ROM_c$ 26 is outputted from the data terminals $D_0$–$D_7$ of the $ROM_C$ 26. The data kx the level-shift data kx in accordance with the voice coding law (μ-law). That is, the microcomputer codes the level-shift data kx to obtain the data z on the basis of the following equation:

$$z = sgn(kx) \frac{\ln(1 + \mu^{|kx|})}{\ln(1 + \mu)} \tag{4}$$

This is followed by step S48, at which the microcomputer outputs the coded data z. From this point onward, the processing is the same as that for the case where the level shift was performed by table conversion carried out by the $ROM_c$ 26.

It should be noted that voice data, which is obtained by shifting all voice data by respective amounts of shift in accordance with Eqs. (1) through (4), is stored in the $ROM_c$ 26 in advance. The data kx is voice signal data whose voice signal level, which is indicated by the data y, has been attenuated 15 dB.

The voice signal data kx outputted by the $ROM_c$ 26 shown in FIG. 8 is coded by the coding circuit 32 and inputted to the exchange switch MTS 8 as the signal of time slot T0 on the second input highway $FHW_b$ 28. The CPU 4 connects the time slot T0 of the second input highway $FHW_b$ 28 and the appropriate time slot of the output highway $BHW_a$ 16.

More specifically, in the second embodiment, the data of time slot T0 on the input highway $FHW_a$ 15 is decoded, level-shifted and then coded, and the code data obtained by the decoding, level shifting and coding is connected to the time slot allocated to the terminal (e.g., the leased telephone 19 or the analog individual line telephone 17) from which an output is desired.

In a case where data received from the digital line 1 is outputted to the digital terminal 18 connected to the extension, the CPU 4 controls the exchange switch MTS 8 in such a manner that the input highway $FHW_a$ 15 and the output highway $BHW_a$ 16 are directly connected, as a result of which this data will not pass through the level controller 14.

Thus, in accordance with this embodiment, the level of the voice signal indicated by the data received from the digital line 1 can be shifted to an appropriate level. As a result, the problem of excessive sound volume of a received voice does not arise even if a signal received from the digital line 1 is received by the analog individual line telephone 17 or the leased telephone 19 connected to the extension.

In accordance with the present invention, as described above, the following advantages are obtained:

(1) The level of the voice signal indicated by the data received from the digital line 1 can be shifted to an appropriate level by the level controller 14. As a result, the problem of excessive sound volume of a received voice does not arise even if a signal received from the digital line 1 is received by the analog individual line telephone 17 or the leased telephone 19 connected to the extension.

(2) When an incoming call is received from an ISDN (digital line 1) and the digital line 1 is to be connected to the digital terminal 18, the line and the terminal are connected directly. If the digital line 1 and the analog individual line telephone 17 are to be connected, the line and the terminal are connected via the level controller 14. Therefore, if an incoming call is received from an ISDN (digital line 1), the appropriate speech quality can be obtained irrespective of the type of extension terminal connected.

(3) The level controller 14 does not serve as an intermediary when there is an outgoing call from the digital terminal 18 to the ISDN (digital line 1). When there is an outgoing call from the analog individual line telephone 17 or the leased telephone 19 to the ISDN (digital line 1), the call is placed to the ISDN (digital line 1) through the level controller 14. In either case, the appropriate speech quality can be obtained without relation to the type of extension terminal from which the outgoing call originates.

(4) When a telephone conversation takes place using the pay station network PSTN (analog line 2), the appropriate speech quality can be obtained irrespective of the type of extension terminal by adjusting the gain of the variable gain amplifier in the analog-line interface 10, the degree of attenuation in the variable attenuator of the extension analog individual line telephone interface 11 and the degree of attenuation in the variable attenuator incorporated in the leased telephone 19.

Thus, in accordance with the present invention, there is provided a telephone exchange apparatus in which the signal level of a signal received from an outside line is converted in dependence upon the type of outside line and the type of extension terminal to be connected, whereby it is possible to obtain the optimum speech quality irrespective of the type of terminal and the type of outside line connected to an extension.

As many apparently widely different embodiments of the present invention can be made without departing from the spirit and scope thereof, it is to be understood that the invention is not limited to the specific embodiments thereof except as defined in the appended claims.

What is claimed is:

1. A telephone exchange apparatus comprising:
   receiving means for receiving voice code data from a digital external line;
   converting means for digitally converting the voice code data received by said receiving means in accordance with a type of extension terminal to which the converted voice code data is transmitted; and
   exchanging means for connecting the digital external line and the extension terminal via said converting means;
   said converting means performing the digital conversion so that a signal level of the converted voice code data is attenuated.

2. The apparatus according to claim 1, wherein said converting means performs the digital conversion so that the signal level is attenuated when the converted voice code data is outputted to an extension terminal devoid of function that allows it to be connected to a digital external line.

3. The apparatus according to claim 1, wherein amount of attenuation of the signal level by said converting means is capable of being adjusted manually.

4. The apparatus according to claim 1, wherein said converting means is constituted by a conversion table stored in memory means.

5. The apparatus according to claim 4, wherein said memory means is a ROM.

6. The apparatus according to claim 1, wherein said converting means performs the digital conversion so that the signal level of the converted voice code data to be transmitted to an analog extension terminal can be attenuated.

7. A telephone exchange apparatus comprising:
   an outside-line interface for accommodating a digital network including at least one digital external line;
   an extension interface for accommodating a digital terminal and an analog terminal; and
   converting means for converting a loudness level of a voice signal;
   said converting means converting the loudness level depending on whether the voice signal from said digital external line is transmitted to said analog terminal.

8. The apparatus according to claim 7, wherein an amount of conversion of the loudness level by said converting means is capable of being adjusted from said analog terminal.

9. The apparatus according to claim 7, further comprising exchanging means for exchanging the digital external line accommodated by said outside-line interface with the extension terminals accommodated by the extension interface,
   wherein said exchanging means connects the digital external line to one of the extension terminals via said converting means.

10. The apparatus according to claim 7, wherein said converting means has a memory for storing a table for converting the loudness level.

11. A telephone exchange apparatus comprising:
    outside-line accommodating means accommodating an outside-line;
    extension accommodating means accommodating extension terminals of a plurality of types; and
    converting means for converting a loudness level of a voice signal from the outside-line in dependence upon the type of an extension terminal to which the converted voice signal is transmitted.

12. The apparatus according to claim 11, wherein the amount of conversion of the loudness level by said converting means is capable of being adjusted from a prescribed extension terminal.

13. The apparatus according to claim 11, further comprising exchanging means for exchanging the outside-line with the extension terminals, wherein said exchanging means connects the outside-line to one of the extension terminals via said converting means.

14. The apparatus according to claim 11, wherein said converting means attenuates the loudness level when the voice signal comes in from the outside-line to an analog terminal.

15. The apparatus according to claim 11, wherein said converting means has a memory for storing a table for converting the loudness level.

16. A telephone exchange control method for a telephone exchange apparatus which exchanges an outside-line with extension terminals, comprising the steps of:

determining whether or not a digital outside-line and an analog extension terminal are to be connected; and connecting the digital outside-line to the analog extension terminal via a signal level shift-unit in accordance with a determination result obtained in said determining step, wherein said signal level shift-unit shifts a loudness level of a voice signal coming from the digital outside-line to the analog extension terminal.

17. The method according to claim 16, wherein in said connecting step, exchanging the digital outside-line with the analog extension terminal is controlled to connect the digital outside-line to the analog extension terminal.

18. A loudness level shifting method for an exchange apparatus which exchanges a first or a second extension, comprising the steps of:

discriminating whether an audio signal is transmitted to the first extension or the second extension;

shifting a loudness level of the audio signal in accordance with the discrimination obtained at said discriminating step; and transmitting the audio signal with the shifted loudness level to the first or the second extension.

19. The method according to claim 18, further comprising a receiving step of receiving the audio signal from a digital line.

20. The method according to claim 18, wherein said shifting step shifts the loudness level using a table for loudness-level shifting stored in a memory.

21. The method according to claim 18, wherein in said shifting step, an exchange switch is controlled to shift the loudness level.

* * * * *

UNITED STATES PATENT AND TRADEMARK OFFICE
CERTIFICATE OF CORRECTION

PATENT NO. : 5,467,395

DATED : November 14, 1995

INVENTOR : MICHIHIRO IZUMI   Page 1 of 2

It is certified that error appears in the above-identified patent and that said Letters Patent is hereby corrected as shown below:

ON THE TITLE PAGE:

[56] References Cited

U.S. Patent Documents, "5,155,772  10/1922 Branoman et al." should read --5,155,772  10/1992 Brandman et al.--.

Foreign Patent Documents, "56-90666  10/1981 Japan" should read --56-90666  7/1981 Japan--; "59-44188  6/1984  Japan" should read --59-44188  3/1984  Japan--; "1212169  8/1989  Japan" should read --1-212169  8/1989  Japan--;
delete "2401138 of 000 United Kingdom";
delete "8000289  2/1980 WIPO".

IN THE DRAWINGS

Sheet 1 of 9, FIG. 1, "RAMa" should read --ROMa--.

COLUMN 1

Line 23, "conversion" should read --conversation--.

COLUMN 7

Line 2,  "dialing an" should read --dialing. If an--;
Line 21, "In a case the" should read --In the case that the--;

UNITED STATES PATENT AND TRADEMARK OFFICE
CERTIFICATE OF CORRECTION

PATENT NO. : 5,467,395

DATED : November 14, 1995

INVENTOR : MICHIHIRO IZUMI

It is certified that error appears in the above-identified patent and that said Letters Patent is hereby corrected as shown below:

```
Line 25,   "connect the" should read --connect--;
Line 59,   "(digital line 1." should read --(digital
line 1.)--.
```

COLUMN 10

```
Line 20, "20 logk=-15db         (5)" should read
--20logk=-15db         (5)--;
Line 22, "k=10⁻ʹ⁵ʹ²⁰ =0.177828              (6)" should
read --k=10⁻¹⁵ʹ²⁰  =0.177828              (6)--;
Line 42, "data kx the level-shift data kx" should
read --data kx and the level-shift data kx are--;
Line 50, "step S48," should read --step S98--.
```

COLUMN 12

```
Line 21, "amount" should read --an amount--.
```

Signed and Sealed this

Eleventh Day of June, 1996

Attest:

BRUCE LEHMAN

*Attesting Officer*  *Commissioner of Patents and Trademarks*